(12) United States Patent  (10) Patent No.: US 8,472,953 B2
Lee  (45) Date of Patent: Jun. 25, 2013

(54) APPARATUS AND METHOD FOR REGISTERING TEMPORARY SUBSCRIBER OF SMALL BASE STATION IN WIRELESS COMMUNICATION SYSTEM

(75) Inventor: Ju Hyun Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 127 days.

(21) Appl. No.: 13/015,890

(22) Filed: Jan. 28, 2011

(65) Prior Publication Data

US 2011/0189993 A1  Aug. 4, 2011

(30) Foreign Application Priority Data

Feb. 3, 2010 (KR) .................. 10-2010-0009886

(51) Int. Cl.
*H04W 4/00* (2009.01)
(52) U.S. Cl.
USPC ............... 455/435.1; 455/435.2; 455/411; 370/310; 370/395.2; 726/2; 726/3; 726/6
(58) Field of Classification Search
USPC ...................................................... 455/435.1
See application file for complete search history.

(56) References Cited

U.S. PATENT DOCUMENTS

| | | | |
|---|---|---|---|
| 2007/0183427 A1* | 8/2007 | Nylander et al. | 370/395.2 |
| 2009/0094680 A1* | 4/2009 | Gupta et al. | 726/3 |
| 2009/0098871 A1* | 4/2009 | Gogic | 455/435.1 |
| 2009/0217364 A1* | 8/2009 | Salmela et al. | 726/6 |
| 2009/0288145 A1* | 11/2009 | Huber et al. | 726/3 |
| 2010/0110945 A1* | 5/2010 | Koskela et al. | 370/310 |
| 2010/0113020 A1* | 5/2010 | Subramanian et al. | 455/435.2 |
| 2010/0197307 A1* | 8/2010 | Horn et al. | 455/435.1 |
| 2011/0010543 A1* | 1/2011 | Schmidt et al. | 713/168 |
| 2011/0223912 A1* | 9/2011 | Nasielski et al. | 455/435.1 |
| 2012/0129497 A1* | 5/2012 | De Benedittis et al. | 455/411 |

FOREIGN PATENT DOCUMENTS

| | | |
|---|---|---|
| JP | 2009-124671 | 6/2009 |
| JP | 2009-141945 | 6/2009 |
| KR | 1020090114718 | 11/2009 |
| KR | 1020090115030 | 11/2009 |

OTHER PUBLICATIONS

3GPP TR 23.830 V9.0.0 (Sep. 2009) Architecture aspects of Home NodeB and Home eNodeB (Release 8), retrieved from the internet.*

* cited by examiner

*Primary Examiner* — Charles Shedrick
(74) *Attorney, Agent, or Firm* — H.C. Park & Associates, PLC

(57) ABSTRACT

A mobile terminal transmits a temporary subscriber request message requesting a temporary subscriber registration to a subscriber management server of a core network via a macro base station if camping on a small base station fails, a subscriber management server receives the temporary subscriber request message and transmits the temporary subscriber request message to the small base station if the mobile terminal is registrable as a temporary subscriber of the small base station, and a small base station receives the temporary subscriber request message and determines whether to accept or reject the temporary subscriber registration of the mobile terminal, and transmits, to the subscriber management server or to the mobile terminal, a temporary subscriber response message indicating that the mobile terminal is permitted to be registered as a temporary subscriber if the temporary subscriber registration is accepted.

19 Claims, 8 Drawing Sheets

APPARATUS AND METHOD FOR REGISTERING TEMPORARY SUBSCRIBER OF SMALL BASE STATION IN WIRELESS COMMUNICATION SYSTEM

CROSS-REFERENCE TO RELATED APPLICATION

This application claims priority from and the benefit under 35 U.S.C. §119(a) of Korean Patent Application No. 10-2010-0009886, filed on Feb. 3, 2010, which is hereby incorporated by reference for all purposes as if fully set forth herein.

BACKGROUND

1. Field

Exemplary embodiments of the present invention relate to an apparatus and a method for registering a mobile terminal as a temporary subscriber of a small base station.

2. Discussion of the Background

In a wireless communication system, a channel may be in a poor state due to is geographical conditions for a cell, a distance between a terminal and a base station, or movement of a terminal, and as a result, a communication between a terminal and a base station may not be carried out well. In particular, if the terminal is located in a closed building, such as an office or a home, a state of a channel between a terminal and a base station degrades, resulting in a dead zone. A terminal placed in the dead zone is not capable of establishing a communication with a base station.

A picocell solution has been introduced to eliminate an indoor dead zone, and a femtocell solution has also been suggested to provide a larger amount of people with a higher level of data service and to eliminate an indoor dead zone. The femtocell has a smaller cell area than a macrocell, and one macrocell may have a plurality of femtocells included therein.

The femtocell has a smaller coverage than an existing wireless communication coverage, and a coverage of the femtocell is in a range that enables the femtocell to serve a single home. If a femto base station is connected to a wired Internet Protocol (IP) network in a home, a mobile terminal is capable of using a wireless communication service freely via the femto base station.

Advantageously, the femtocell also eliminates a dead zone where a wireless communication service is not available, and utilizes an indoor communication infrastructure for wired or wireless coverage. However, it is difficult to limit a coverage of the femtocell only to a home in which a femtocell base station is installed in a femtocell wireless communication environment. A radio signal of the femto base station may arrive at adjacent buildings, and in some instances, a mobile terminal in adjacent buildings may use a wireless communication service via the femtocell. This is similar to a case in which a radio signal of a wireless local area network (LAN) access point installed in a home reaches adjacent buildings and a computer in an is adjacent building can access the wireless LAN access point, and similar problems may occur accordingly.

Some users may not want an external mobile terminal or computer to access a femto base station or a wireless LAN access point installed in the users' home and use a communication service via the wireless LAN access point. In case of a femtocell wireless communication, accessing a femto base station may negatively affect various charging policies of a wireless communication service provider. There is a need to keep an unauthorized user from using a wireless communication service via a femtocell.

Thus, a user of a mobile terminal needs to be registered as an authorized subscriber to use a wireless communication service via a femtocell. However, if the user wants to receive a wireless communication service in a coverage of a femtocell to which the user did not subscribe, the user should make a request to an operator of the femtocell for registration as a temporary subscriber and is then registered as a temporary subscriber.

SUMMARY

Exemplary embodiments of the present invention provide an apparatus and a method for registering a mobile terminal as a temporary subscriber of a small base station.

Exemplary embodiments of the present invention also provide an apparatus and a method for registering a mobile terminal as a temporary subscriber of a small base station by an automatic request for temporary subscriber registration without a request by a user of the mobile terminal for temporary subscriber registration to an operator of a small base station in a wireless communication system.

Exemplary embodiments of the present invention also provide an apparatus and a is method for registering a mobile terminal as a temporary subscriber of a small base station in response to a request for temporary subscriber registration via a subscriber management server of a core network.

Exemplary embodiments of the present invention also provide an apparatus and a method for registering a mobile terminal as a temporary subscriber of a small base station in response to a request for temporary subscriber registration via a subscriber management server of a core network, wherein the request for temporary subscriber registration is automatically made by the mobile terminal via the subscriber management server without a request by a user of the mobile terminal for temporary subscriber registration to an operator of the small base station.

Additional features of the invention will be set forth in the description which follows, and in part will be apparent from the description, or may be learned by practice of the invention.

An exemplary embodiment of the present invention discloses a method for registering a mobile terminal as a temporary subscriber of a small base station by the mobile terminal, the method including: generating a temporary subscriber request message requesting a temporary subscriber registration if camping on the small base station fails; and transmitting the temporary subscriber request message to a subscriber management server of a core network via a macro base station.

An exemplary embodiment of the present invention discloses a method for registering a mobile terminal as a temporary subscriber of a small base station by a subscriber management server, the method including: receiving a temporary subscriber request message requesting a temporary subscriber registration; determining whether a mobile terminal that transmitted the temporary subscriber request message is registrable as a temporary subscriber of is the small base station included in the temporary subscriber request message; and transmitting the temporary subscriber request message to the small base station if the mobile terminal is registrable as a temporary subscriber of the small base station.

An exemplary embodiment of the present invention discloses a method for registering a mobile terminal as a temporary subscriber of a small base station by the small base station, the method including: receiving, from a subscriber management server of a core network, a temporary subscriber request message requesting a temporary subscriber registration; determining whether to accept or reject the temporary subscriber registration of the mobile terminal included in the temporary subscriber request message; and transmitting, to the subscriber management server or to the mobile terminal, a temporary subscriber response message indicating that the mobile terminal is permitted to be registered as a temporary subscriber, if the temporary subscriber registration is accepted.

An exemplary embodiment of the present invention discloses an apparatus to register a mobile terminal as a temporary subscriber of a small base station in the mobile terminal, the apparatus including: a message processing unit to generate a temporary subscriber request message requesting a temporary subscriber registration; and a temporary subscriber processing unit to transmit the temporary subscriber request message to a subscriber management server of a core network via a macro base station if camping on the small base station fails.

An exemplary embodiment of the present invention discloses an apparatus to register a mobile terminal as a temporary subscriber of a small base station in a subscriber management server, including: a message processing unit to receive, from the mobile terminal, a temporary subscriber request message requesting a temporary subscriber registration, and to read is the temporary subscriber request message; and a temporary subscriber managing unit to determine whether the mobile terminal is registrable as a temporary subscriber of the small base station included in the temporary subscriber request message, and to transmit the temporary subscriber request message to the small base station if the mobile terminal is registrable as a temporary subscriber of the small base station.

An exemplary embodiment of the present invention discloses an apparatus to register a mobile terminal as a temporary subscriber of a small base station in the small base station, including: a message processing unit to receive, from a subscriber management server of a core network, a temporary subscriber request message requesting a temporary subscriber registration, and to generate a temporary subscriber response message indicating that the mobile terminal is permitted to be registered as a temporary subscriber if the temporary subscriber registration is accepted; and a registration determination unit to determine whether to accept or reject the temporary subscriber registration of the mobile terminal included in the temporary subscriber request message, and to transmit the temporary subscriber response message to the subscriber management server or to the mobile terminal if the temporary subscriber registration of the mobile terminal is accepted.

An exemplary embodiment of the present invention discloses a wireless communication system to register a mobile terminal as a temporary subscriber of a small base station, including: a mobile terminal to transmit a temporary subscriber request to a subscriber management server of a core network via a macro base station if camping on a small base station fails, the temporary subscriber request message requesting a temporary subscriber registration to the small base station; a subscriber management server to receive the temporary subscriber request message and to transmit the temporary subscriber request message to the small base is station if the mobile terminal is registrable as a temporary subscriber of the small base station; and a small base station to receive the temporary subscriber request message and to determine whether to accept or reject the temporary subscriber registration of the mobile terminal, and to transmit, to the subscriber management server or to the mobile terminal, a temporary subscriber response message indicating that the mobile terminal is permitted to be registered as a temporary subscriber if the temporary subscriber registration is accepted.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
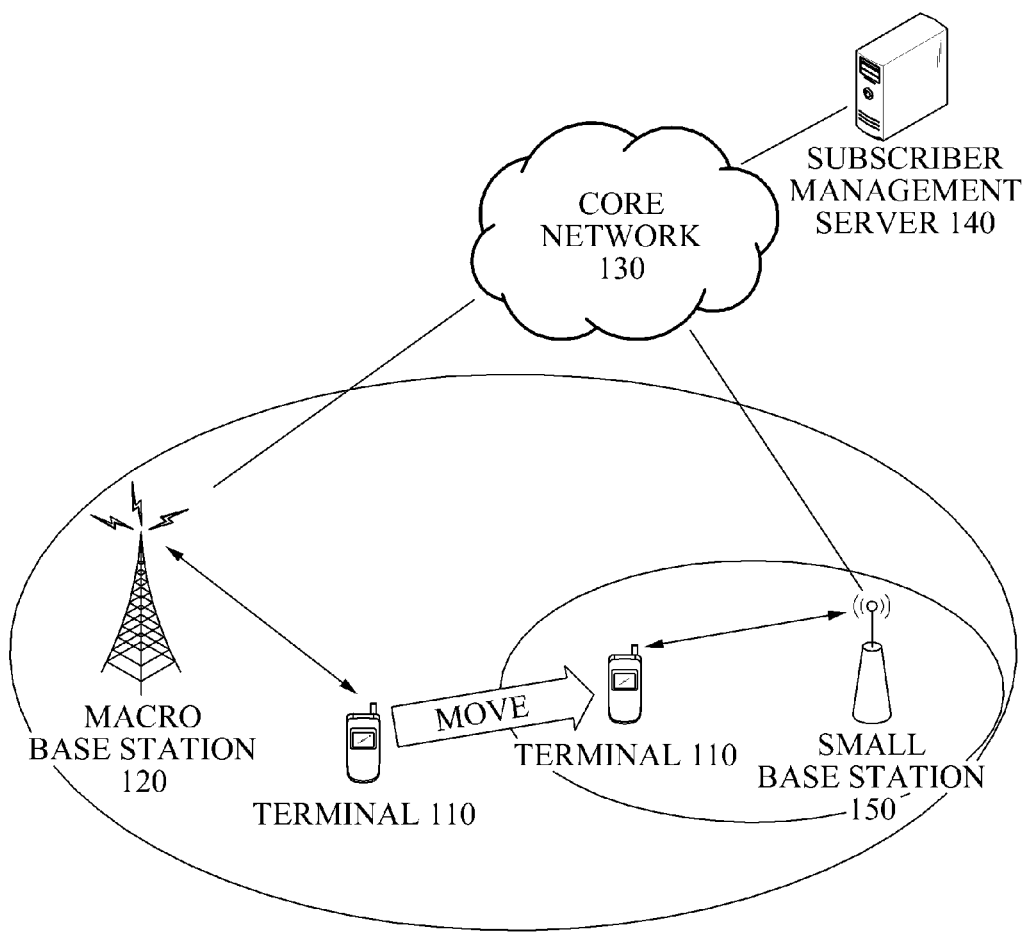
FIG. 1 illustrates a wireless communication system in which a mobile terminal is registered as a temporary subscriber of a small base station via a core network according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like is reference numerals in the drawings denote like elements.

The exemplary embodiments of the present invention relate to an apparatus and a method for registering a mobile terminal as a temporary subscriber of a small base station in a wireless communication system by an automatic request for temporary subscriber registration without a request by a user of the mobile terminal for temporary subscriber registration to an operator of the small base station.

FIG. 1 illustrates a wireless communication system in which a mobile terminal is registered as a temporary subscriber of a small base station via a core network according to an exemplary embodiment of the present invention.

Referring to FIG. 1, the wireless communication system may include a mobile terminal 110, a macro base station 120, a core network 130, a subscriber management server 140, and a small base station 150.

The small base station 150 provides a wireless communication service to a closed subscriber group (CSG) among terminals within a cell area of the small base station 150. If the mobile terminal 110 is not an authorized subscriber to the CSG but intends to be served by the small base station 150 in the cell area of the small base station 150, the mobile terminal 150 may be registered as a temporary subscriber of the small base station 150. The small base station 150 may be, for example, a femtocell base station, a home nodeB (HeNB), or a wireless local area network (LAN) access point.

If the mobile terminal 110 intends to be registered as a temporary subscriber of the small base station 150, the mobile terminal 110 requests the subscriber management server 140 for relay of a temporary subscriber registration by transmitting a temporary subscriber request message to the subscriber management server 140 of the core network 130 via the macro is base station 120.

If the subscriber management server 140 receives the temporary subscriber request message, the subscriber management server 140 determines whether the mobile terminal 110 can be registered as a temporary subscriber of the small base station 150. If the mobile terminal 110 can be registered as a temporary subscriber of the small base station 150, the subscriber management server 140 relays a temporary subscriber registration by transmitting the received temporary subscriber request message to the small base station 150. In this instance, the subscriber management server 140 may exist by itself or may be included in a mobile management entity (MME), a mobile switching center (MSC), or a serving general packet radio service support node (SGSN).

If the small base station 150 receives the temporary subscriber request message via the subscriber management server 140, the small base station 150 determines whether to register the mobile terminal 110 as a temporary subscriber. If the small base station 150 accepts the temporary subscriber registration of the mobile terminal 110, the small base station 150 transmits a temporary subscriber response message, to the mobile terminal 110 via the subscriber management server 140 or directly to the mobile terminal 110, indicating that the mobile terminal 110 is registered as a temporary subscriber. Conversely, if the small base station 150 rejects the temporary subscriber registration of the mobile terminal 110, the small base station 150 transmits a temporary subscriber reject message, to the mobile terminal 110 via the subscriber management server 140, indicating that the mobile terminal 110 is not permitted to be registered as a temporary subscriber.

Figure 2:
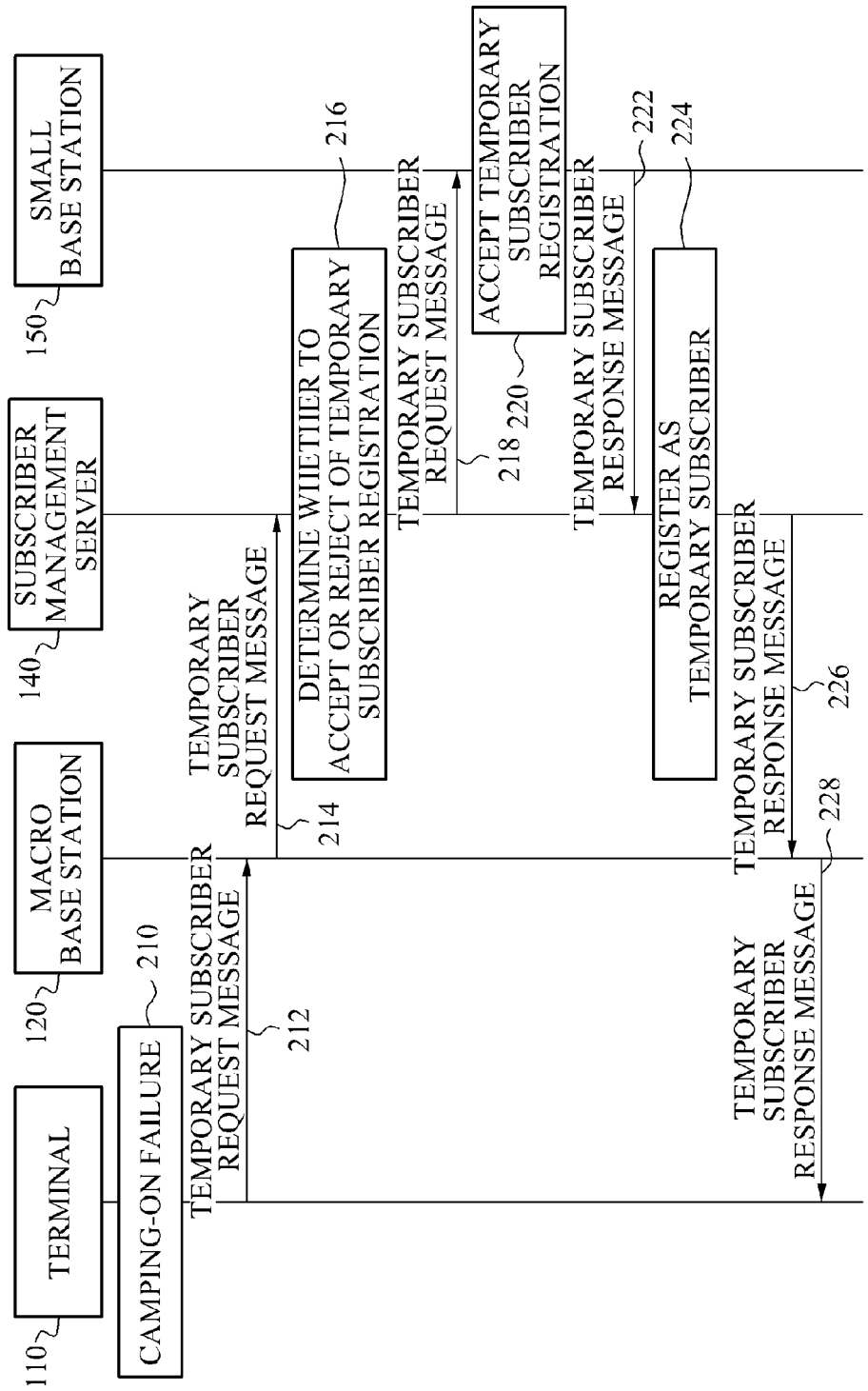
FIG. 2 illustrates a method for registering a mobile terminal as a temporary subscriber of a small base station according to an exemplary embodiment of the present invention.

FIG. 2 illustrates a method for registering a mobile terminal as a temporary subscriber of a small base station according to an exemplary embodiment of the present is invention. Referring to FIG. 2, if the mobile terminal 110 fails to camp on the small base station 150 in operation 210, the mobile terminal 110 generates a temporary subscriber request message and transmits the message to the macro base station 120 in operation 212. However, aspects are not limited thereto such that the mobile terminal 110 may transmit the message to the macro base station 120 without having failed to camp on the small base station 150 in operation 210.

If the macro base station 120 receives the temporary subscriber request message, the macro base station 120 transmits the message to the subscriber management server 140 in operation 214.

If the subscriber management server 140 receives the temporary subscriber request message, the subscriber management server 140 determines whether the mobile terminal 110 can be registered as a temporary subscriber of the small base station 150 in operation 216. The determination on whether the mobile terminal 110 can be registered as a temporary subscriber may depend on a preset standard of each wireless communication provider. The standard to be considered may be a coverage of the small base station 150.

If the mobile terminal 110 can be registered as a temporary subscriber, the subscriber management serve 140 transmits the temporary subscriber request message to the small base station 150 in operation 218.

If the small base station 150 receives the temporary subscriber request message, the small base station 150 determines whether to accept or reject the temporary subscriber registration of the mobile terminal 110 in operation 220. If the temporary subscriber registration is accepted, the small base station 150 transmits a temporary subscriber response message to the subscriber management server 140 indicating that the mobile terminal 110 is permitted to be registered as a temporary subscriber in operation 222.

If the subscriber management server 140 receives the temporary subscriber response message, the subscriber management server 140 registers the mobile terminal 110 as a temporary subscriber of the small base station 140 in operation 224, and transmits the temporary subscriber response message to the macro base station 120 in operation 226. If the macro base station 120 receives the temporary subscriber response message, the macro base station 120 transmits the temporary subscriber response message to the mobile terminal 110 in operation 228. However, aspects are not limited thereto, such that, as described above, the small base station 150 may transmit the temporary subscriber response message directly to the mobile terminal 110 in operation 222. Further, the small base station 150 may reject the mobile terminal 110 and transmit the temporary subscriber reject message to the mobile terminal 110 via the subscriber management server 140.

Hereinafter, described is a method for registering a mobile terminal as a temporary subscriber of a small base station by each component of the wireless communication system of FIG. 1 with reference to FIGS. 3 to 5.

Figure 3:
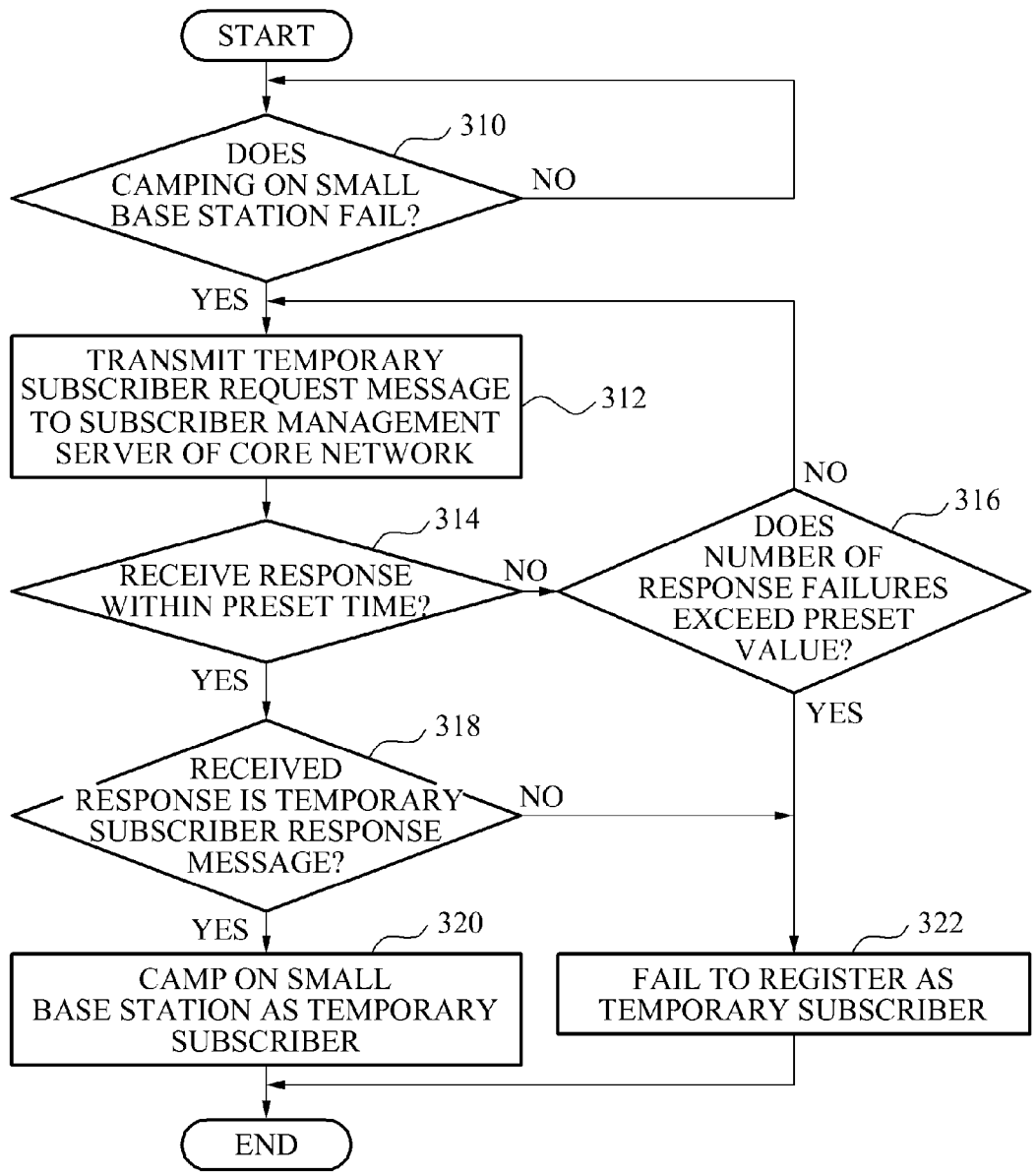
FIG. 3 is a flowchart illustrating a method by a mobile terminal for registering the is mobile terminal as a temporary subscriber of a small base station according to an exemplary embodiment of the present invention.

FIG. 3 is a flowchart illustrating a method by a mobile terminal for registering the mobile terminal as a temporary subscriber of a small base station according to an exemplary embodiment of the present invention.

Referring to FIG. 3, if a mobile terminal fails to camp on a small base station in operation 310, the mobile terminal generates a temporary subscriber request message requesting a temporary subscriber registration and transmits the message to a subscriber management server of a core network via a macro base station in operation 312. However, as described above, aspects are not limited thereto such that the mobile terminal need not fail in camping on the small base station before generating and transmitting the temporary subscriber request message.

The temporary subscriber request message includes information about a small base station and information about a mobile terminal, and may further include a temporary subscriber identity information to be registered, and information about a core network. Here, the information about a small base station may include identification information about the small base station, information about an operator of the small base station, information on measured channel state, and the like. The information about a mobile terminal may include current state information about the mobile terminal, an international mobile station identity (IMSI) number, a temporary mobile subscriber identity (TMSI) number, a name or a nickname of a user of the mobile terminal, and the like.

Also, the mobile terminal checks whether the mobile terminal receives a response to the temporary subscriber request message within a preset time in operation 314.

If the mobile terminal does not receive a response within a preset time in operation 314, the mobile terminal checks whether a number of response failures exceeds a preset value in operation 316. If the number of response failures does not exceed a preset value in operation 316, the mobile terminal returns to operation 312. If the number of response failures exceeds the preset value in operation 316, the mobile terminal fails to register as a temporary subscriber in operation 322.

If the mobile terminal receives a response within a preset time in operation 314, the mobile terminal checks whether the received response is a temporary subscriber response message in operation 318. The temporary subscriber response message includes information about a small base station and information about a mobile terminal, and may further include a temporary subscriber identity information to be registered and information about a core network.

If the received response is a temporary subscriber response message in operation is 318, the mobile terminal camps on the small base station as a temporary subscriber in operation 320.

Conversely, if the number of response failure exceeds a preset value in operation 316, or if the received response is a temporary subscriber reject message in operation 318, the mobile terminal determines the temporary subscriber registration as having failed in operation 322 The temporary subscriber reject message includes information about a small base station and information about a mobile terminal, and may further include temporary subscriber identity information to be registered, information about a core network, and a reason for rejection.

Figure 4:
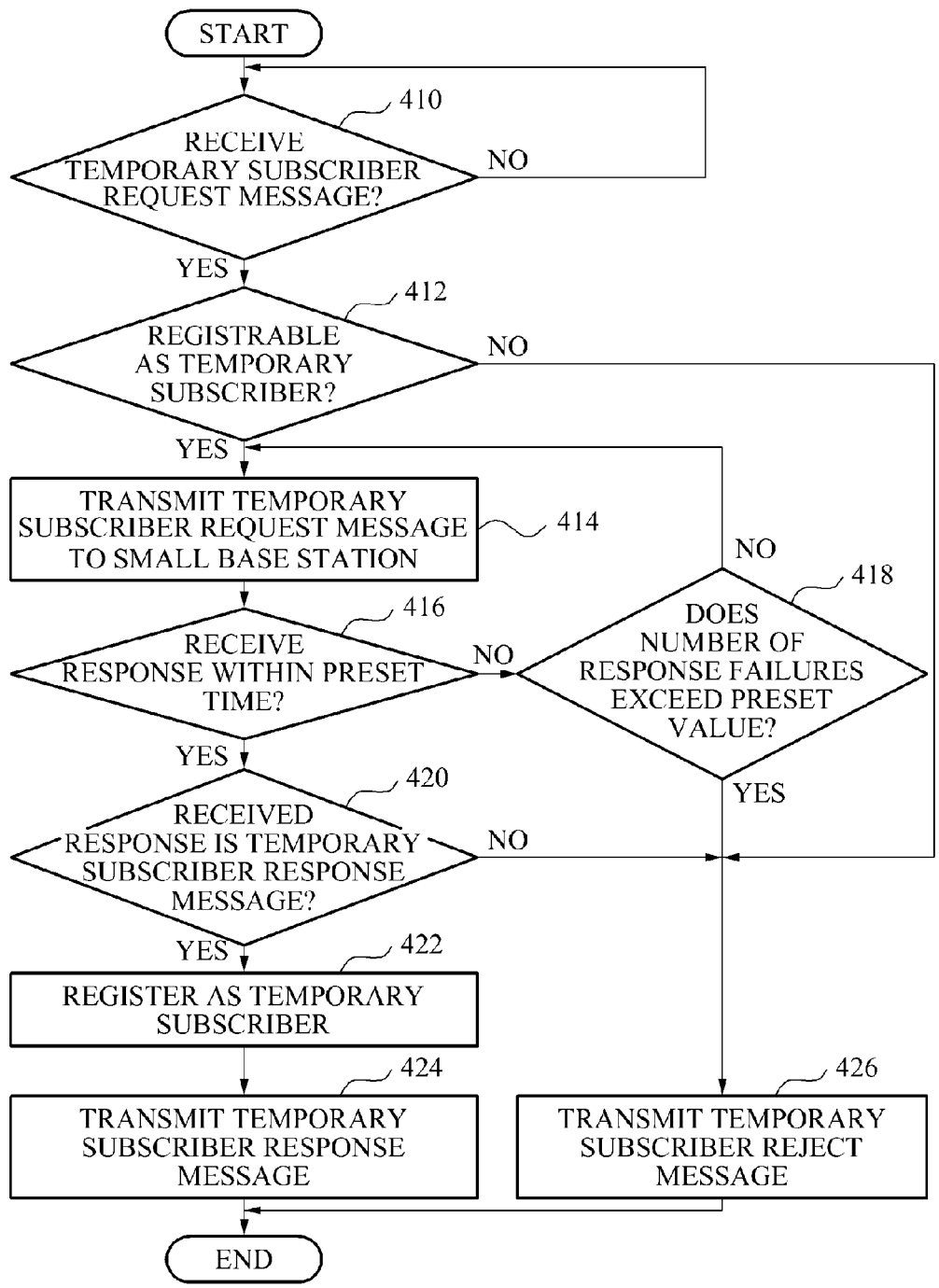
FIG. 4 is a flowchart illustrating a method by a subscriber management server for relaying an operation of registering a mobile terminal as a temporary subscriber of a small base station according to an exemplary embodiment of the present invention.

FIG. 4 is a flowchart illustrating a method by a subscriber management server for relaying an operation of registering a mobile terminal as a temporary subscriber of a small base station according to an exemplary embodiment of the present invention.

Referring to FIG. 4, if a subscriber management server receives a temporary subscriber request message from a mobile terminal via a macro base station in operation 410, the subscriber management server checks information about a small base station included in the temporary subscriber request message and determines whether the mobile terminal can be registered as a temporary subscriber of the small base station in operation 412. The determination on whether the mobile terminal can be registered as a temporary subscriber of the small base station depends on a preset standard of each wireless communication provider. The standard to be considered may be a coverage of the small base station.

If the mobile terminal can be registered as a temporary subscriber, the subscriber management server transmits the temporary subscriber request message to the small base station in operation 414.

The subscriber management server checks whether the subscriber management is server receives a response to the temporary subscriber request message within a preset time in operation 416.

If the subscriber management server does not receive a response within a preset time in operation 416, the subscriber management server checks whether the number of response failures exceeds a preset value in operation 418. If the number of response failures does not exceed a preset value in operation 418, the subscriber management server returns to operation 414. If the number of response failures exceeds the preset value in operation 418, the subscriber management server transmits a temporary subscriber reject message to the mobile terminal in operation 426.

If the subscriber management server receives a response within a preset time in operation 416, the subscriber management server checks whether the received response is a temporary subscriber response message in operation 420.

If the received response is a temporary subscriber response message in operation 420, the subscriber management server registers the mobile terminal as a temporary subscriber of the small base station by recording the mobile terminal in a temporary subscriber list of the small base station in operation 422. Next, the subscriber management server transmits the temporary subscriber response message to the mobile terminal in operation 424. In this instance, the operation 424 may be performed by the small base station.

Alternatively, if the mobile terminal cannot be registered as a temporary subscriber in operation 412, or if the number of response failures exceeds a preset value in operation 418, or if the received response is a temporary subscriber reject message in operation 420, the subscriber management server transmits to the mobile terminal the temporary subscriber reject message indicating that the temporary subscriber registration is rejected in operation 426.

Figure 5:
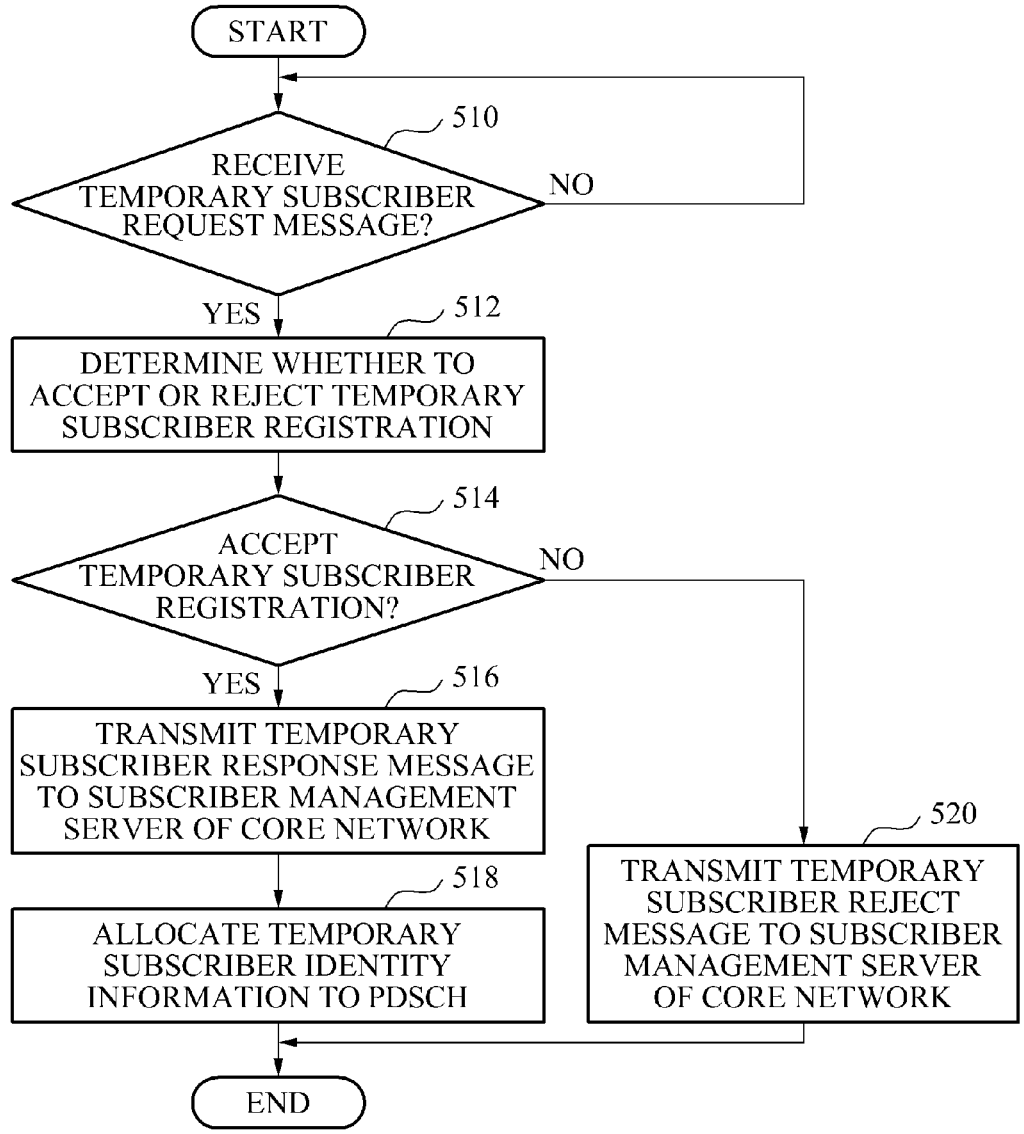
FIG. 5 is a flowchart illustrating a method by a small base station for registering a mobile terminal as a temporary subscriber of the small base station in response to a request for temporary subscriber registration according to an exemplary embodiment of the present invention.

FIG. 5 is a flowchart illustrating a method by a small base station for registering a mobile terminal as a temporary subscriber of the small base station in response to a request for temporary subscriber registration according to an exemplary embodiment of the present invention.

Referring to FIG. 5, if a small base station receives a temporary subscriber request message from a subscriber management server in operation 510, the small base station determines whether to accept or reject the temporary subscriber registration in operation 512. The acceptance or rejection of the temporary subscriber registration may be determined in accordance with a preset registration standard or a determination by an operator of the small base station in response to a request regarding whether to accept or reject the temporary subscriber registration.

The small base station checks whether the temporary subscriber registration is accepted in operation 514. If the temporary subscriber registration is accepted in operation 514, the small base station transmits, to the subscriber management server of the core network, a temporary subscriber response message indicating that the mobile terminal is permitted to be registered as a temporary subscriber in operation 516. However, aspects are not limited thereto such that the small base station may transmit the temporary subscriber response message indicating that the mobile terminal is permitted to be registered as a temporary subscriber to the mobile terminal in operation 516. The small base station then allocates temporary subscriber identity information, which is assigned to the mobile terminal, to a physical downlink shared channel (PDSCH), and transmits the temporary subscriber identity information in operation 518.

Conversely, if the temporary subscriber registration is rejected in operation 514, the small base station transmits, to the subscriber management server of a core network, a is temporary subscriber reject message indicating that the mobile terminal is not permitted to be a temporary subscriber in operation 520.

Figure 6:
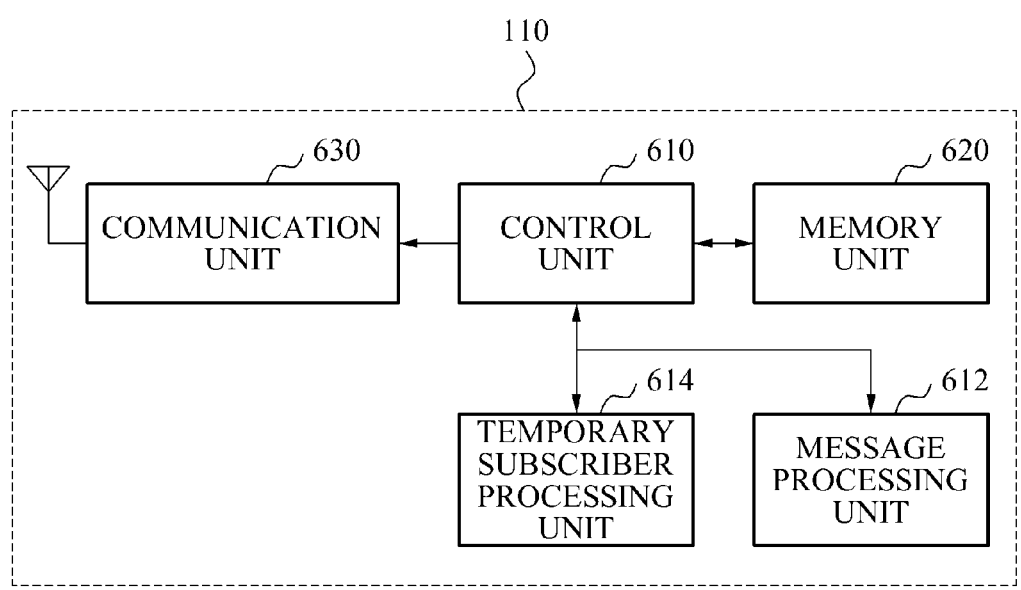
FIG. 6 is a block diagram illustrating a structure of a mobile terminal that according to an exemplary embodiment of the present invention.

FIG. 6 is a block diagram illustrating a structure of a mobile terminal according to an exemplary embodiment of the present invention. Referring to FIG. 6, the mobile terminal 110 includes a control unit 610, a message processing unit 612, a temporary subscriber processing unit 614, a memory unit 620, and a communication unit 630.

The memory unit 620 stores a program for controlling the operation of the mobile terminal 110, and may temporarily store data occurring during operation of the mobile terminal 110 and store data, such as a telephone number, an SMS message, image data, and the like, of the mobile terminal 110. Also, the memory unit 620 may store information about a permitted small base station into which the mobile terminal 110 is authorized to enter a coverage, information about a small base station to which the mobile terminal 110 is registered as a temporary subscriber, and temporary subscriber identity information.

The communication unit 630 may connect to the macro base station 120 and/or the small base station 150, and may transmit/receive data to/from the macro base station 120 and/or the small base station 150.

The message processing unit 612 generates a temporary subscriber request message requesting a temporary subscription registration, and the message processing unit 612 receives and reads a temporary subscriber response message or a temporary subscriber reject message.

The temporary subscriber processing unit 614 transmits a temporary subscriber request message to the subscriber management server 140 of the core network 130 via the macro base station 120. The temporary subscriber processing unit 614 may transmit the temporary is subscriber request message to the subscriber management server 140 of the core network 130 via the macro base station 120 if the mobile terminal fails to camp on the small base station 150.

If the temporary subscriber processing unit 614 transmits the temporary subscriber request message to the subscriber management server 140 and then does not receive a temporary subscriber response message or receives a temporary subscriber reject message indicating that the temporary subscriber registration is rejected, the temporary subscriber processing unit 614 determines that the mobile terminal has failed to be registered as a temporary subscriber.

The control unit 610 may control the operation of the mobile terminal 110 in addition to performing operations of the message processing unit 612 and the temporary subscriber processing unit 614. Although the operations are described separately for ease of description, the control unit 610 may be configured to handle all the operations or a part of the operations of the message processing unit 612 and the temporary subscriber processing unit 614.

Figure 7:
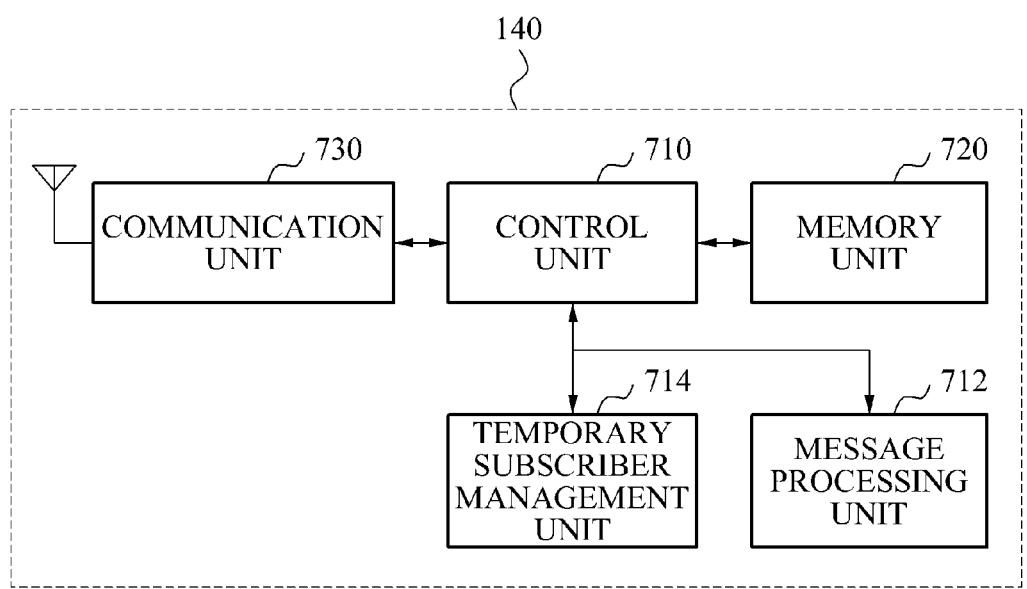
FIG. 7 is a block diagram illustrating a structure of a subscriber management server according to an exemplary embodiment of the present invention.

FIG. 7 is a block diagram illustrating a structure of a subscriber management server according to an exemplary embodiment of the present invention. Referring to FIG. 7, the subscriber management server 140 includes a control unit 710, a message processing unit 712, a temporary subscriber management unit 714, a memory unit 720, and a communication unit 730.

The memory unit 720 stores a program for controlling the operation of the subscriber management server 140, and may temporarily store data generated and/or used during operation of the subscriber management server 140. Also, the memory unit 720 may store temporary subscriber lists of small base stations.

The communication unit 730 may connect to the macro base station 120 and/or the small base station 150 via the core network 130, and may transmit/receive data to/from the macro base station 120 and/or the small base station 150.

The message processing unit 712 receives and reads a temporary subscriber request message, a temporary subscriber response message, or a temporary subscriber reject message.

The temporary subscriber management unit 714 determines whether the mobile terminal 110 that transmitted the temporary subscriber request message can be registered as a temporary subscriber of the small base station 150 included in the temporary subscriber request message. If the mobile terminal 110 can be registered as a temporary subscriber of the small base station 150, the temporary subscriber management unit 714 transmits the temporary subscriber request message to the small base station 150.

Also, if the temporary subscriber management unit 714 receives, from the small base station 150, a temporary subscriber response message indicating that the temporary subscriber registration is accepted, the temporary subscriber management unit 714 registers the mobile terminal 110 as a temporary subscriber by recording the mobile terminal 110 in a temporary subscriber list in the memory unit 720. If the temporary subscriber management unit 714 registers the mobile terminal 110 as a temporary subscriber of the small base station 150, the temporary subscriber management unit 714 transmits the temporary subscriber response message to the mobile terminal 110.

Also, if the mobile terminal 110 cannot be registered as a temporary subscriber of the small base station 150, or if the temporary subscriber management unit 714 receives a temporary subscriber reject message indicating that the temporary subscriber registration is rejected by the small base station 150, the temporary subscriber management unit 714 transmits the temporary subscriber reject message to the mobile terminal 110.

The control unit 710 may control the operation of the subscriber management is server 140 in addition to performing operations of the message processing unit 712 and the temporary subscriber management unit 714. Although the operations are described separately for ease of description, the control unit 710 may be configured to handle all the operations or a part of the operations of the message processing unit 712 and the temporary subscriber management unit 714.

Figure 8:
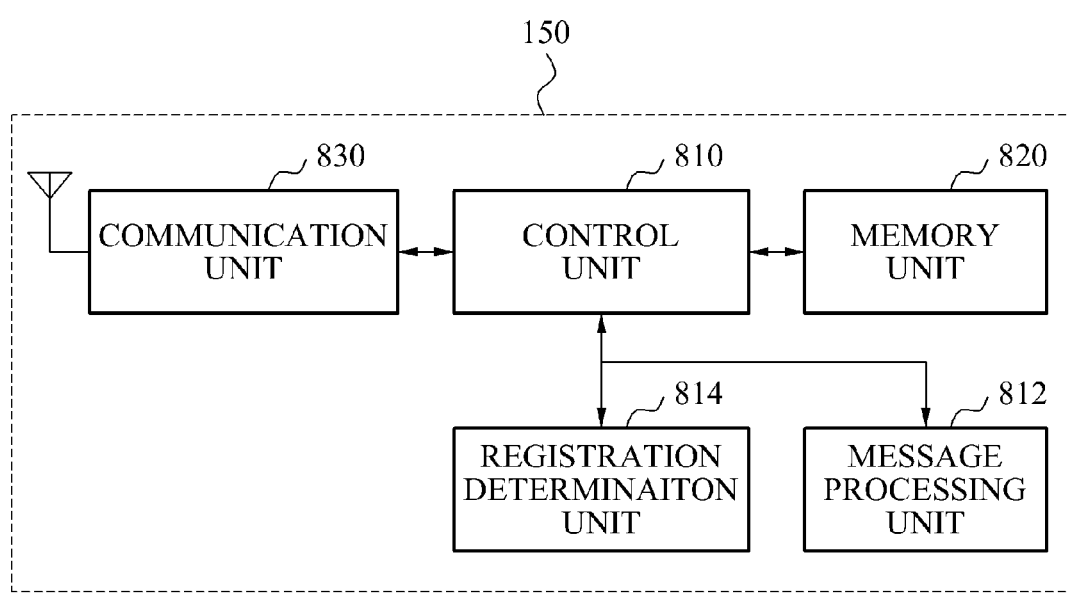
FIG. 8 is a block diagram illustrating a structure of a small base station according to an exemplary embodiment of the present invention.

FIG. 8 is a block diagram illustrating a structure of a small base station according to an exemplary embodiment of the present invention. Referring to FIG. 8, the small base station 150 includes a control unit 810, a message processing unit 812, a registration determination unit 814, a memory unit 820 and a communication unit 830.

The memory unit 820 stores a program for controlling the operation of the small base station 150, and may temporarily store data occurring during operation of the small base station 150. Also, the memory unit 820 may store identification information about the small base station 150, temporary subscriber identity information uniquely assigned to each mobile terminal registered as a temporary subscriber, and information about a mobile terminal registered as a temporary subscriber.

The communication unit 830 may connect to the subscriber management server 140 via the core network 130, and may transmit/receive data to/from the subscriber management server 140. Also, the communication unit 830 may connect to a permitted subscriber terminal in a cell area of the small base station 150 and/or a terminal registered as a temporary subscriber, and may transmit/receive data to/from the permitted subscriber terminal and/or the terminal registered as a temporary subscriber.

The message processing unit 812 reads a temporary subscriber request message requesting a temporary subscriber registration, and may generate a temporary subscriber is response message indicating that the temporary subscriber registration is accepted, or a temporary subscriber reject message indicating that the temporary subscriber registration is rejected under the control of the registration determination unit 814.

The registration determination unit 814 determines whether to accept or reject a temporary subscriber registration of the mobile terminal 110 included in the temporary subscriber request message, and if the temporary subscriber registration is accepted, the registration determination unit 814 transmits a temporary subscriber response message to the subscriber management server 140. However, aspects are not limited thereto such that the registration determination unit 814 may transmit the temporary subscriber response message to the mobile terminal 110.

The registration determination unit 814 may determine acceptance or rejection of the temporary subscriber registration in accordance with a preset registration standard, or a determination by an operator of the small base station in response to a request regarding whether to accept or reject the temporary subscriber registration.

If the temporary subscriber registration of the mobile terminal 110 is accepted, the registration determination unit 814 may allocate a temporary subscriber identity information, which is assigned to the mobile terminal 110, to a PDSCH.

If the temporary subscriber registration of the mobile terminal 110 is rejected, the registration determination unit 814 transmits a temporary subscriber reject message to the subscriber management server 140.

The control unit 810 may control the operation of the small base station 150 in addition to performing operations of the message processing unit 812 and the registration determination unit 814. Although the operations are described separately for ease of description, is the control unit 810 may be configured to handle all the operations or a part of the operations of the message processing unit 812 and the registration determination unit 814.

Exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media, such as hard disks, floppy disks, and magnetic tape; optical media, such as CD ROM disks and DVD; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for registering a mobile terminal as a temporary subscriber of a small base station by a subscriber management server, the method comprising:
   receiving, by the subscriber management server, a temporary subscriber request message requesting a temporary subscriber registration;
   determining, by the subscriber management server, whether a mobile terminal that transmitted the temporary subscriber request message is registrable as a temporary subscriber of the small base station included in the temporary subscriber request message;
   transmitting, by the subscriber management server, the temporary subscriber request message to the small base station if the mobile terminal is registrable as a temporary subscriber of the small base station; and
   registering the mobile terminal as a temporary subscriber of the small base station if receiving, from the small base station, a temporary subscriber response message indicating the temporary subscriber registration is accepted.

2. The method of claim 1, further comprising:
   transmitting the temporary subscriber response message to the mobile terminal if the mobile terminal is registered as a temporary subscriber of the small base station.

3. The method of claim 1, further comprising:
   transmitting, to the mobile terminal, a temporary subscriber reject message indicating that the temporary subscriber registration is rejected, if the mobile terminal is not registrable as a temporary subscriber of the small base station, or if receiving the temporary subscriber reject message from the small base station.

4. A method for registering a mobile terminal as a temporary subscriber of a small base station by the small base station, the method comprising:
   receiving, by the small base station from a subscriber management server of a core network, a temporary subscriber request message requesting a temporary subscriber registration;
   determining, by the small base station, whether to accept or reject the temporary subscriber registration of the mobile terminal included in the temporary subscriber request message; and
   transmitting, by the small base station to the subscriber management server or to the mobile terminal, a temporary subscriber response message indicating that the mobile terminal is permitted to be registered as a temporary subscriber, if the temporary subscriber registration is accepted.

5. The method of claim 4, wherein the determination of acceptance or rejection of the temporary subscriber registration is based on a preset registration standard, or is based on a determination by an operator of the small base station of whether to accept or reject the temporary subscriber registration.

6. The method of claim 4, further comprising:
   transmitting the temporary subscriber response message, and allocating a temporary subscriber identity information, which is assigned to the mobile terminal, to a physical downlink shared channel (PDSCH), and transmitting the temporary subscriber identity information.

7. The method of claim 4, further comprising:
transmitting, to the subscriber management server, a temporary subscriber reject message indicating that the mobile terminal is not permitted to be registered as a temporary subscriber, if the temporary subscriber registration of the mobile terminal is rejected.

8. An apparatus to register a mobile terminal as a temporary subscriber of a small base station in a subscriber management server, the apparatus comprising:
a memory unit;
a message processing unit to receive, from the mobile terminal, a temporary subscriber request message requesting a temporary subscriber registration, and to read the temporary subscriber request message; and
a temporary subscriber managing unit to determine whether the mobile terminal is registrable as a temporary subscriber of the small base station included in the temporary subscriber request message, and to transmit the temporary subscriber request message to the small base station if the mobile terminal is registrable as a temporary subscriber of the small base station,
wherein the message processing unit receives, from the small base station, a temporary subscriber response message indicating that the temporary subscriber registration is accepted, and the temporary subscriber managing unit registers the mobile terminal as a temporary subscriber of the small base station if the temporary subscriber response message is received.

9. The apparatus of claim 8, wherein the temporary subscriber managing unit transmits the temporary subscriber response message to the mobile terminal if the mobile terminal is registered as a temporary subscriber of the small base station.

10. The apparatus of claim 8, wherein the message processing unit receives, from the small base station, a temporary subscriber reject message indicating that the temporary subscriber registration is rejected, and the temporary subscriber managing unit transmits the temporary subscriber reject message to the mobile terminal if the mobile terminal is not registrable as a temporary subscriber of the small base station or if the temporary subscriber reject message is received.

11. An apparatus to register a mobile terminal as a temporary subscriber of a small base station in the small base station, the apparatus comprising:
a memory unit;
a message processing unit to receive, from a subscriber management server of a core network, a temporary subscriber request message requesting a temporary subscriber registration, and to generate a temporary subscriber response message indicating that the mobile terminal is permitted to be registered as a temporary subscriber if the temporary subscriber registration is accepted; and
a registration determination unit to determine whether to accept or reject the temporary subscriber registration of the mobile terminal included in the temporary subscriber request message, and to transmit the temporary subscriber response message to the subscriber management server or to the mobile terminal if the temporary subscriber registration of the mobile terminal is accepted.

12. The apparatus of claim 11, wherein the registration determination unit determines acceptance or rejection of the temporary subscriber registration based on a preset registration standard, or based on a determination by an operator of the small base station on whether to accept or reject the temporary subscriber registration.

13. The apparatus of claim 11, wherein the registration determination unit allocates a temporary subscriber identity information, which is assigned to the mobile terminal, to a physical downlink shared channel (PDSCH) if the temporary subscriber registration of the mobile terminal is accepted.

14. The apparatus of claim 11, wherein the message processing unit generates a temporary subscriber reject message indicating that the temporary subscriber registration is rejected, and the registration determination unit transmits the temporary subscriber reject message to the subscriber management server if the temporary subscriber registration of the mobile terminal is rejected.

15. A wireless communication system to register a mobile terminal as a temporary subscriber of a small base station, the system comprising:
a mobile terminal to transmit a temporary subscriber request to a subscriber management server of a core network via a macro base station if camping on a small base station fails, the temporary subscriber request message requesting a temporary subscriber registration to the small base station;
a subscriber management server to receive the temporary subscriber request message and to transmit the temporary subscriber request message to the small base station if the mobile terminal is registrable as a temporary subscriber of the small base station; and
a small base station to receive the temporary subscriber request message and to determine whether to accept or reject the temporary subscriber registration of the mobile terminal, and to transmit, to the subscriber management server or to the mobile terminal, a temporary subscriber response message indicating that the mobile terminal is permitted to be registered as a temporary subscriber if the temporary subscriber registration is accepted.

16. The system of claim 15, wherein the small base station transmits, to the mobile terminal via the subscriber management server, a temporary subscriber reject message indicating that the mobile terminal is not permitted to be registered as a temporary subscriber if the temporary subscriber registration is rejected,
wherein the subscriber management server transmits the temporary subscriber reject message to the mobile terminal if the mobile terminal is not registrable as a temporary subscriber or if the subscriber management server receives the temporary subscriber reject message, and
wherein the mobile terminal determines the temporary subscriber registration as having failed after transmitting the temporary subscriber request message if the mobile terminal does not receive the temporary subscriber response message or receives the temporary subscriber reject message.

17. The system of claim 16, wherein the temporary subscriber request message, the temporary subscriber response message, and the temporary subscriber reject message include information about the small base station and information about the mobile terminal.

18. The system of claim 17, wherein the temporary subscriber request message, the temporary subscriber response message, and the temporary subscriber reject message further include at least one of a temporary subscriber identity information to be registered and information about the core network.

19. The system of claim 17, wherein the temporary subscriber reject message further includes rejection information indicating a reason for rejection.

\* \* \* \* \*